United States Patent [19]

Shirako

[11] Patent Number: 4,607,306
[45] Date of Patent: Aug. 19, 1986

[54] TAPE CASSETTE WITH LINER SHEET INSERT

[75] Inventor: Hideo Shirako, Tokyo, Japan

[73] Assignee: Olympus Optical Co., Ltd., Tokyo, Japan

[21] Appl. No.: 589,459

[22] Filed: Mar. 14, 1984

[51] Int. Cl.⁴ .................. G11B 23/02; G11B 15/32
[52] U.S. Cl. .................................... 360/132; 242/199
[58] Field of Search ............... 360/132; 242/197, 198, 242/199

[56] References Cited

U.S. PATENT DOCUMENTS

| | | | |
|---|---|---|---|
| 3,495,787 | 2/1970 | Wallace | 242/199 |
| 4,126,283 | 11/1978 | Kawachi | 242/199 |
| 4,127,242 | 11/1978 | Hashimoto et al. | 242/199 |
| 4,466,036 | 8/1984 | Ishida et al. | 242/199 |
| 4,516,181 | 5/1985 | Shirako | 360/132 |
| 4,563,718 | 1/1986 | Shirako | 360/132 |

Primary Examiner—John H. Wolff
Assistant Examiner—Andrew L. Sniezek
Attorney, Agent, or Firm—Frishauf, Holtz, Goodman & Woodward

[57] ABSTRACT

A tape cassette comprising a magnetic tape, a pair of hubs about which the magnetic tape is wound, a pair of cassette halves for holding the magnetic tape and paired hubs, one liner sheet extending between one cassette half and one plane of a pair of tape rolls and another liner sheet extending between another cassette half and the opposite plane of the paired tape rolls. Each liner sheet is provided with a first projection extending along the peripheral wall of the hub insertion holes to elastically contact the hub and a tape wound about the hub, and a second group of projections which occupy a position facing that point at which the succeeding linearly traveling portion of the tape contacts the preceding wound portion of the tape, extends in the direction in which the contact portion is moved and elastically contacts the outermost portion of the tape roll. Each cassette half is provided with ribs, which occupy a position facing the first projection and second projection group, formed on the liner sheet to elastically press the first and second projections to the tape edges, thereby preventing the tape from being irregularly wound about the hubs.

6 Claims, 2 Drawing Figures

TAPE CASSETTE WITH LINER SHEET INSERT

BACKGROUND OF THE INVENTION

This invention relates to a tape cassette, and more particularly to a tape cassette which is provided with a liner sheet intended to prevent a magnetic tape from being irregularly wound about a hub.

When a magnetic tape received in an audio apparatus is made to run at the time of recording, reproduction or rewind, the tape is generally wound about one of the two hubs. In this case, the hub tends to be shaken while being wound with a tape, sometimes resulting in the irregular winding of the tape. To prevent the occurrence of such an objectionable event, therefore, a liner sheet is held between the tape and half case to prevent the shaking of the hub.

A presently known liner sheet includes not only a flat type but also a type having a purposely modulated surface. In the case of either of the conventional liner sheets, suppressing the shaking of the hub has been tried by simply causing the liner sheet to contact the edge of a magnetic tape wound about the hub. However, the hub is noticeably shaken particularly at the initial stage of tape winding. The reason for this occurrence is that when initially wound about the hub, the tape has a particularly small radius of curvature and high tension on the tape. Consequently any increased rigidity of the magnetic tape or any irregular winding of the tape about the hub causes the hub to be significantly affected by the resultant tension of such an irregular tape. The tension of the tape exerts a noticeable action on the hub not only in its rotating direction but also in a direction perpendicularly to the rotating direction. Moreover at the initial stage of tape winding, a minimum amount of mass is present at the hub which, consequently, is held in an unstable state and is more readily shaken.

When a tape is wound about the hub, it sometimes happens that a linearly travelling tape to be wound about a hub has its edge displaced from a prescribed position on the hub, or the edge of the succeeding portion of the travelling tape is displaced from the edge of the preceding portion of the tape which has already been wound about the hub. With the conventional tape cassette, therefore, a tape sometimes tends to be irregularly wound about the hub, presenting difficulties in ensuring the stable run of the tape.

SUMMARY OF THE INVENTION

This invention is intended to provide a tape cassette which prevents the irregular winding of a tape, thereby ensuring its stable performance.

To attain the above-mentioned object, this invention provides a tape cassette comprising a magnetic tape, a pair of hubs about which the magnetic tape is wound, a linear sheet which is set close to the edge of the magnetic tape to guide its travel, and it is provided with holes allowing for the insertion of the paired hubs. A first projection on the sheet extends outward so as to elastically contact the hubs, and the tape wound thereabout, along the periphery of said insertion holes. A second group of projections is provided at that point at which a succeeding linear-travelling magnetic tape contacts the preceding wound portion of the tape, said second projection group extending in the direction in which said contact portion is moved in accordance with the amount of the tape which has been wound about the hub and elastically contacting the wound portion of the tape. A pair of cassette halves is provided for holding the tape and hub by means of said liner sheet, each cassette half being provided with holes allowing for the insertion of the paired hubs, a first rib, extending along the peripheral walls of the insertion holes, to support the hubs, a second rib facing said first projection to elastically press said first projection to the peripheral wall of the hub, and a third rib facing said second projection group to elastically press said second projection group to the edges of that portion of the magnetic tape which has been wound about the hub.

DETAILED DESCRIPTION OF THE PREFERRED EMBODIMENT

Figure 1:
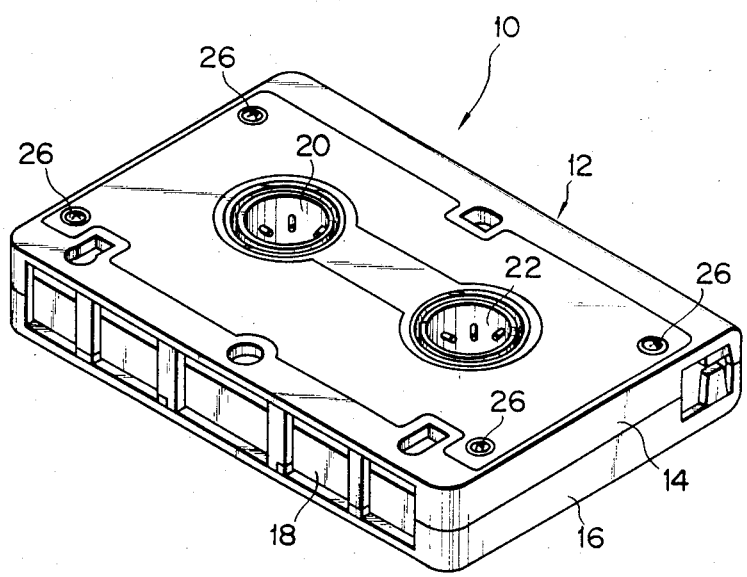
FIG. 1 is an oblique view of a tape cassette embodying this invention.
Figure 2:
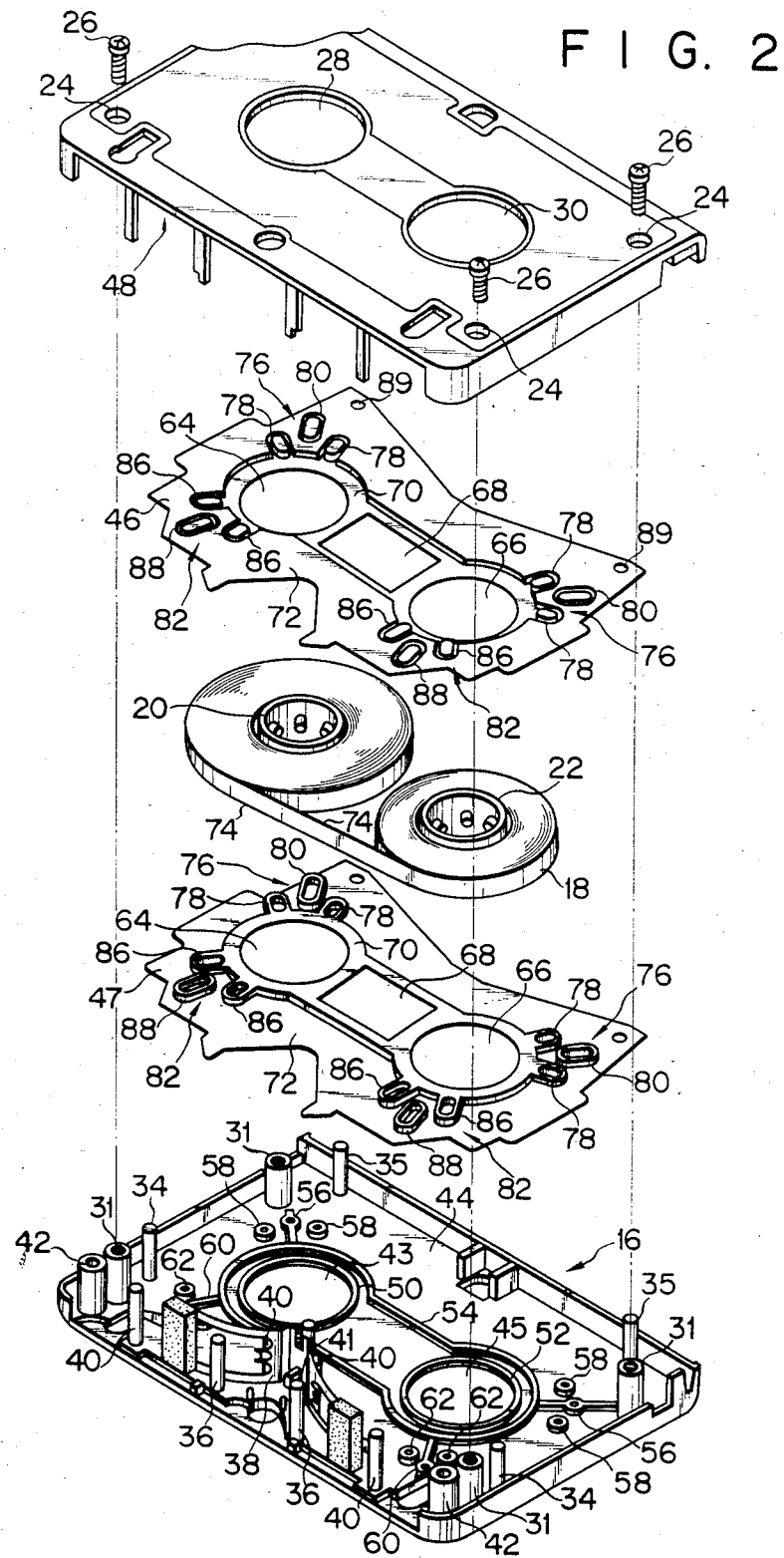
FIG. 2 is an exploded oblique view of a tape cassette shown in FIG. 1.

With a tape cassette 10 embodying this invention, a magnetic tape 18 is received, as shown in FIGS. 1 and 2, in a case 12 formed of a pair of cassette halves 14 and 16 prepared from transparent plastic material. The magnetic tape 18 is fixed to a pair of hubs 20 and 22 at each end. The tape 18 is wound about one or both of said paired hubs 20 and 22, according to the operation mode.

The corners of one cassette half 14 are each provided with a hole 24 for screw 26. A screw 26 is inserted into said screw hole 24 to connect both cassette halves 14, 16 (FIG. 1) together. A pair of hub holes 28 and 30 (FIG. 2) are formed along a lengthwise central line of one cassette half 14 to support the hubs 20 and 22. In the other cassette half 16, pillars 31, internally threaded for the insertion of the screw 26, are provided at a point facing the screw hole 24. Pins 34 for guiding both cassette halves 14 and 16, and pins 35 for supporting liner sheets 46 and 47 (described later) when the sheets set in the case are erected at certain points along the periphery of the other cassette half 16. Two guide pins 36, for guiding a travelling magnetic tape 18, are provided along the opening formed on the other cassette half 16 which allows for the insertion of a recording and reproduction head (not shown). Near said head insertion opening a pad spring 38 is provided which presses the magnetic tape to said head when it is inserted. This pad spring 38 is shaped substantially like the letter V and is supported at the center and at both ends by a projecting pin 40, provided on the other cassette half 16. A pair of substantially pillar like guide rollers 42 are provided at both ends of the head insertion window. A pair of hub holes 43 and 45 are formed along a lengthwise central line of the inner wall 44 of the other cassette half 16. Inner wall 44 is further provided with a plurality of ribs for elastically pressing a later described projection, formed on the liner sheet 47, to the lower edge of a tape already wound about the hub or that of a tape which is going to be wound about the hub.

The inner wall 48 of said one cassette half 14 is provided with ribs shaped substantially like those formed on the inner wall of said other cassette half 16 in the corresponding position. Therefore, the detailed description of the ribs formed on the inner wall of the other cassette half 16 facilitates the understanding of similar ribs formed on the inner wall of said one cassette half 14, a description thereof being omitted.

First annular ribs 50 and 52, are formed around the corresponding hub holes 43 and 45. Said first annular ribs 50 and 52 project from the inner wall 44 of said other cassette half 16 to a prescribed height, and the top plane of said annular ribs 50 and 52 are made flat. A second rib 54, for supporting the later described liner sheet 46, is formed around the aforesaid first ribs 50 and 52 so as to project to a height substantially equal to said first ribs 50 and 52. That portion of said second rib 54 which extends between the hub holes 43 and 45 is made substantially straight. Those portions of second rib 54 which are close to the first ribs 50 and 52 are made arcuate in conformity to the shape of first ribs 50 and 52. A third rib 56 linearly extends outward (to support the liner sheet 46) from those portions of the second rib 54 which surround the first ribs 50 and 52. The third rib 56 is positioned below that region in which a tape (travelling linearly through the guide pin 34) and hub contact each other, or said travelling tape and that portion of the tape which is already wound about the hub contact each other. Third rib 56 extends in the direction in which the tape is wound and said mutually contacting region is moved. The third rib 56 is chosen to have such a length as corresponds to the thickness of a tape 18 which is completely wound about one of the paired hubs 20 and 22. An arcuate portion is formed in the intermediate part of the third rib 56 which extends from the second rib 54. A fourth rib 58 having a round surface is provided close to both sides of said third rib 56 to support the liner sheet 46. Provided near the guide pin 40 and formed like the third rib 56 is a fifth rib 60 which linearly extends from the second rib 54 toward the opening of the cassette case 12 to support the liner sheet 46. Provided on one side of each fifth rib 60 is a sixth liner sheetsupporting rib 62. All the aforementioned first to sixth ribs project from the inner wall 44 of said other cassette half 16 to substantially the same height.

Description may now be made of the liner sheets 46 and 47. One liner sheet 46 is held between one cassette half 14, a tape assembly 18, and paired hubs 20 and 22. Similarly another liner sheet 47 is interposed between the other cassette half 16, the tape assembly, and paired hubs 20 and 22. These liner sheets 46 and 47 are held in the cassette case 10 with their convex planes made to face each other.

The same parts of both liner sheets 46 and 47, made in the same form, are denoted by the same numerals. Therefore, liner sheet 47 alone is detailed, the description of the one liner sheet 46 being omitted. Liner sheet 47 is provided with penetrating holes 64 and 66 allowing for the insertion of the corresponding hubs 20 and 22. Said hub holes 64 and 66 are respectively made to face the holes 28 and 30, formed in the cassette half 16.

That portion of the liner sheet 47, defined between the penetrating holes 64 and 66 is provided with a window 68 through which the condition of a tape wound about the hubs 20 and 22 can be observed from the outside of the cassette case 12. A first projection 70 is formed on the flat plane 72 so as to surround the penetrating holes 64 and 66 and window 68. The first projection 70 is formed on inside of the second rib 54 to press the first projection 70 toward the magnetic tape 18. When the tape 18 is wound about the hub 20 or 22, said first projection 70 touches the edge 74 of the tape 18, causing said tape 18 to be wound about the hub with its edge properly positioned, and also elastically contacts the tape 18, preventing the hubs 20 and 22 and tape 18 wound thereabout from being eccentrically or vertically shifted.

A second group 76 of projections is formed on the flat plane 72 so as to face the third and fourth ribs 56 and 58. Second projection group 76 suppresses the occurrence of the aforementioned undesirable shifting to ensure the proper position of the tape edge, thereby enabling a linearly travelling tape to be freshly wound about the hub or the already wound portion of the preceding tape in a proper condition. The second projection group 76 includes a pair of semielliptic annular-component projections 78 protruding outward from the first projection 70. Provided between the two second component projections 78 is a third elliptic annular-component projection 80 whose inner end reaches that point at which a tape 18 is fully wound about the hubs 20 and 22. As seen from the foregoing description, the second projection group 76 comprises a pair of second component projections 78 and a third component projection 80. Spatially set paired component projections 78 can disperse stress applied to the tape 18.

A fourth group 82 of projections is formed in a substantially, linear, symmetric relationship to the second projection group 76 with respect to a line extending between the centers of the penetrating holes 64 and 66. This fourth projection group 82 includes a pair of fourth semieliptic annular-component projections 86 protruding outward from the first projection 70. Provided between said fourth paired component projections 86 is a fifth elliptic annular-component projection 88 whose inner end reaches that point at which the tape 18 is wound about one of the hubs 20 and 22 to a maximum extent. Therefore, the fourth projection group 82, consisting of a pair of fourth component projections 86 and fifth component projection 88, can disperse stress applied to the tape 18 as described above. Further, the fourth projection group 82 is formed in a substantially linear symmetrical relationship to the second projection group 76 with respect to a line extending between the centers of the penetrating holes 64 and 66. The fourth projection group 82 includes a pair of fourth semielliptic annular-component projections 86 extending from the first projection 70. Provided between said fourth component projections 86 is a fifth elliptic annular-component projection 88 whose inner end reaches that point at which the tape 18 is fully wound about one of the hubs 20 and 22. Therefore, the fourth projection group 82, comprising a pair of fourth component projections 86 and fifth component projection 88, can disperse stress applied to the tape 18 as previously mentioned. Further, the fourth projection group 82 is formed in a substantially linear symmetric relationship to the second projection group 76 with respect to a line extending between the centers of the penetrating holes 64 and 66, thereby enabling the tape 18 to be pressed with a substantially uniform force. Numerals 89 indicate holes which are engaged with the supporting pins 35, as described above.

A tape cassette, according to the above-mentioned embodiment of this invention, offers the following advantages. Referring to the cassette halves 14 and 16, the ribs so formed as to face the projections provided on the corresponding liner sheets 46 and 47 elastically press said projections to the upper and lower edges 74 and the peripheral walls of the hubs 20 and 22. Therefore, the liner sheets 46 and 47 can elastically absorb the shaking of the hubs 20 and 22, which always tends to take place. Further, when the tape 18 begins to be wound about the hub 20, for example, both tape 18 and hub 20 slidably contact the first projection 70, thereby suppressing the shaking of said hub 20. When the tape 18 is wound about the hub 20, for example, the linearly traveling succeeding portion of the tape 18 has its edge alinged with that of the preceding wound portion of the tape 18 by means of the second projection group 76. Therefore, the tape 18 always undergoes tension applied in its traveling direction, thereby suppressing the shaking of the hub 20. Since the second projection group 76 is so arranged as to allow the tape 18 to be fully wound about the hub 20, the tape 18 can be wound about the hub 20 in such a condition that the edges of the succeeding portion of the tape 18 are always aligned with those of its preceding portion. The wound tape 18 is securely held by the second and fourth projection groups 76 and 82 and part of the first projection 70 extending between the penetrating holes 64 and 66. Therefore, the hub 20 is uniformly supported by the components of a force dispersed in three directions and prevented from being shaken in its axial direction.

This invention is not limited to the foregoing embodiment, but can be used with various changes and modifications without departing from its scope and object. Though, for instance, the foregoing embodiment refers to the case where depressions are formed on one side of the liner sheet so as to face projections provided on the other side thereof, this invention is not limited to this arrangement. For example, a liner sheet made smooth on one side and provided with projections on the other ensures practically the same effect as in the above-mentioned embodiment. The first projection is continuously formed on the liner sheet, but can be provided in a discontinuous pattern with the same effect. Further, ribs need not be provided on a cassette half in a continuous restrictive form, but can be discontinously provided with the same effect. In the foregoing embodiment, the second and third projection groups were respectively composed of three component projections. However, each projection group can comprise two, four, or any other number of component projections with the same effect. In the foregoing embodiment, ribs were formed on the cassette half in a position facing the corresponding projections formed on the liner sheet to press said projections directly to the peripheral wall of the hub or the tape. However, the tape cassette of this invention is not limited to such tape. The same effect is ensured by forming ribs in a position slightly apart from the corresponding projections of the liner sheet, thereby indirectly pressing the peripheral walls of said projections to the peripheral wall of the hub or the edges of the tape.

What is claimed is:

1. A tape cassette comprising:
a magnetic tape having a wound portion and a travelling portion;
a pair of hubs which carry the wound portion of said magnetic tape;
a liner sheet set close to the edge of the magnetic tape to guide its travel and having holes allowing for the insertion of the paired hubs, a first projection means along the periphery of said insertion holes and protruding from the sheet so as to elastically contact the hubs and the wound portion of the magnetic tape, and a second projection means provided at that point at which the travelling portion of said magnetic tape contacts the wound portion of the magnetic tape, said second projection means extending along the direction in which said contact point moves as the amount of the tape in said wound portion changes, said second projection means elastically contacting the wound portion of the magnetic tape;
a pair of cassette halves holding the magnetic tape and paired hubs by means of said liner sheet, each cassette half being provided with holes allowing for the insertion of the paired hubs, a first rib corresponding to said first projection means and elastically pressing an area at said first projection means to one of the hubs, and a second rib facing said second projection means elastically pressing said second projection means to the edges of the wound portion of the magnetic tape.

2. The tape cassette, according to claim 1, wherein said second projection means comprises a plurality of component projections set close to each other, thereby causing stress applied to the edges of the magnetic tape to be dispersed in a plurality of directions.

3. The tape cassette, according to claim 2, wherein said second projection means comprises three substantially elliptic annular-component projections.

4. The tape cassette, according to claim 3, wherein said second rib consists of three components facing the respective components of said second projection means, said rib components pressing corresponding components, respectively, of the second projection means against said wound portion of the magnetic tape.

5. The tape cassette, according to claim 1, wherein said liner sheet is provided with two holes allowing for the insertion of the paired hubs and also with an opening enabling the operator to externally observe the condition in which the magnetic tape is wound about the hubs.

6. The tape cassette, according to claim 1, wherein said liner sheet is provided with a third projection means set in symmetrical relationship to the second projection means with respect to a line extending between the centers of said two hub insertion holes; and said cassette half is provided with a rib projectively formed in a position facing said third projection means to elastically press that portion of the liner sheet at said third projection means against the edges of tape in said wound portion.

* * * * *